United States Patent [19]
Hayashi

[11] Patent Number: 6,111,846
[45] Date of Patent: Aug. 29, 2000

[54] APPARATUS FOR REPRODUCING RECORDED INFORMATION

[75] Inventor: Hideki Hayashi, Tokorozawa, Japan

[73] Assignee: Pioneer Electronic Corporation, Tokyo, Japan

[21] Appl. No.: 09/359,637

[22] Filed: Jul. 26, 1999

Related U.S. Application Data

[63] Continuation of application No. 08/889,447, Jul. 8, 1997, Pat. No. 6,009,067.

[30] Foreign Application Priority Data

Jul. 9, 1996 [JP] Japan .................................. 8-198389

[51] Int. Cl.[7] ........................................................ G11B 7/00
[52] U.S. Cl. ............................ 369/124.13; 369/59; 369/47; 369/124.05
[58] Field of Search .................................... 369/59, 47, 48, 369/54, 50, 124.05, 124.13, 124.14, 124.04; 360/51, 65

[56] References Cited

U.S. PATENT DOCUMENTS

| | | | |
|---|---|---|---|
| 5,247,401 | 9/1993 | Umemoto et al. ........................ | 360/51 |
| 5,519,676 | 5/1996 | Kitahara ................................. | 360/65 |
| 5,521,767 | 5/1996 | Weng et al. ............................. | 360/51 |
| 5,719,843 | 2/1998 | Nakajima et al. ....................... | 369/47 |
| 5,878,009 | 3/1999 | Hayashi .................................. | 369/59 |

Primary Examiner—Thang V. Tran
Attorney, Agent, or Firm—Sughrue, Mion, Zinn, Macpeak & Seas, PLLC

[57] ABSTRACT

There is provided an apparatus for reproducing recorded information having a waveform equalization circuit in which a CPU can be freed from complicated processes associated with the setting of band characteristics in a transition of the speed of rotation of a disc as a resulting from high speed access. The waveform equalization circuit has band characteristics that vary depending on the cycle of a clock signal and performs waveform compensation on a series of read samples based on the band characteristics. The band characteristics of the waveform equalization circuit are controlled by a clock signal generated based on a series of sample values which has been subjected to the waveform compensation by such a waveform equalization circuit. With such a configuration, the band characteristics are automatically set in accordance with the cycle of a clock signal having an accurate phase relative to signals read from the disc generated based on the series of sample values which has been subjected to waveform compensation.

4 Claims, 9 Drawing Sheets

APPARATUS FOR REPRODUCING RECORDED INFORMATION

This is a continuation of application Ser. No. 08/889,447 filed Jul. 8, 1997, now U.S. Pat. No. 6,009,067, the disclosure of which is incorporated herein by reference.

BACKGROUND OF THE INVENTION

1. Field of the Invention

The present invention relates to a recorded information reproducing apparatus for reproducing information recorded on an optical disc and, more particularly, to a technique for improving an apparatus for reproducing recorded information including a waveform equalization circuit for compensating for a distortion of a waveform of a read signal that originates in attenuation characteristics in a high frequency band which are frequency characteristics of an optical system of the reproducing apparatus.

2. Description of the Related Art

FIG. 1 illustrates a schematic configuration of a CD (compact disc) player as an apparatus for reproducing recorded information as described above.

Referring to FIG. 1, a CD 3 which is an optical disc driven for rotation by a spindle motor 2 based on a rotation control signal supplied from a spindle servo circuit 9 at a speed of rotation which provides a predetermined linear velocity. A pick-up 1 receives a beam reflected by the CD 3 when the CD 3 is irradiated with a light beam and generates a read signal having a signal level in accordance with the quantity of the received light. A head amplifier 4 supplies an amplified read signal obtained by performing desired amplification on such a read signal to an analog equalizer 5 as a waveform equalization circuit 5.

The analog equalizer 5 performs waveform compensation on this amplified read signal to provide frequency characteristics such that a predetermined high frequency band of the amplified read signal is enhanced and supplies the resultant signal to a comparator 6. Specifically, the analog equalizer 5 increases the amplitude of high frequency components of a read signal by force to compensate for a decrease in the amplitude of such high frequency components which is said to occur in an optical reproduction system such as a CD player.

The comparator 6 compares the signal level of a read signal which has been subjected to waveform compensation by such an analog equalizer 5 with a predetermined reference voltage and generates a binary signal in accordance with the result of the comparison.

A clock signal generation circuit 7 has a configuration of a so-called PLL (phase locked loop) circuit, generates a clock signal which is phase-locked to signal edges of such a binary signal, and supplies it to a sampling circuit 8.

The sampling circuit 8 samples the binary signal at timing in accordance with such a clock signal and sequentially outputs resultant signals as reproduction digital signals.

Meanwhile, such a CD player includes a position detection circuit 10 which outputs a position detection signal indicative of the position of the pick-up 1 in the radial direction of the disc, for example, by optically or mechanically reading a scale (a scale indicating positions in the radial direction) provided on a slider base carrying a slider transporting the pick-up 1 in the radial direction of the disc and includes a frequency detection circuit 11 which detects the speed of rotation (rotational frequency) of the spindle motor 2 that carries the CD 3 and for outputting a frequency detection signal. Each of the detection signals from the position detection circuit 10 and frequency detection circuit 11 is supplied to a control CPU 12.

The control CPU 12 controls an access operation to move the pick-up to a predetermined position to be read on the disc in the radial direction thereof based on the supplied position detection signal and sets a speed of rotation for the disc corresponding to such a predetermined radial position on the CD 3 which is a disc recorded on a CLV (constant linear velocity) basis (hereinafter referred to as "CLV disc") in the spindle servo circuit 9 based on the frequency detection signal.

Meanwhile, a spindle motor 2 for rotating heavy a load like a disc is generally slow in response because of inertial force of the load. Therefore, according to algorithm which waits for the spindle motor 2 to reach a predetermined speed of rotation after a seek operation before proceeding to an operation of reproducing recorded information (decoding operation), a great amount of time is spent before the information recorded in a desired reading position is reproduced. Under such circumstances, algorithm for high speed access is recently employed which proceeds to the operation of reproducing recorded information when the pick-up 1 has moved to a desired reading position as a result of an access operation without waiting for the spindle motor 2 to reach a predetermined speed of rotation at the position on the disc in the radial direction thereof.

Based on the speed of rotation of the spindle motor 2 supplied by the frequency detection circuit 11 at the time when transition from the operation of moving the pick-up 2 to the desired reading position to the reproduction operation takes place, i.e., based on the frequency detection signal indicative of the speed of rotation of the CD 3, the CPU 12 sets the oscillation frequency of a VCO (voltage controlled oscillator), which is not shown, in the clock generation circuit 7 and sets band characteristics of the analog equalizer 5.

After the oscillation frequency of the VCO is initialized by the CPU 12, the clock generation circuit 7 performs phase comparison between signal edges of the binary signal based on the read signal from the CD 3 and a clock signal generated by the VCO and generates a clock signal which is phase-locked to the signal edges of the binary signal. Since the speed of rotation of the spindle motor 2 varies until it is subjected to control for steady rotation after reaching a predetermined speed of rotation, the frequency of the binary signal varies in accordance with the variation of the speed of rotation. However, once phase-locking is achieved, the clock signal generation circuit 7 is able to continue to generate a clock signal that follows the variation of the binary signal provided that the range of the variation of the binary signal is within the band width which the PLL can follow. Therefore, the CPU 12 needs only to initialize the oscillation frequency of the clock signal based on the speed of rotation of the spindle motor (the frequency detection signal supplied by the frequency detection circuit 11) at the time when it is brought into the phase-locked state.

Meanwhile, the analog equalizer 5 is constituted by an analog integrated circuit which is a combination of variable conductance amplifiers and MOS capacitor arrays in a multiplicity of stages and has band characteristics, i.e., high frequency band components, that vary depending on conductance set by the CPU 12. During the period in which the speed of rotation of the spindle motor 2 is varied for high speed access as described above, the frequency of the amplified read signal input through the head amplifier 4 also varies depending on the speed of rotation. During such a transition period, the CPU 12 continuously monitors the frequency detection signal and continues to set the conductance so that the band characteristics of the analog equalizer 5 change depending on the change in the frequency of the detection signal.

As described above, the analog equalizer 5 is configured such that its band characteristics vary depending on the conductance set by the CPU 12. Thus, for reproduction of recorded information during a period in which the speed of rotation of a disc varies as a result of high speed access or the like, the CPU 12 must repeatedly set the conductance so that the analog equalizer 5 has band characteristics in accordance with the speed of rotation by continually holding control thereon, which has resulted in a problem that complicated processing must be carried out by the CPU 12.

OBJECT AND SUMMARY OF THE INVENTION

The present invention has been conceived in order to solve the above-described problem, and it is an object of the present invention to provide an apparatus for reproducing recorded information including a waveform equalization circuit capable of reducing the complicatedness of a process required during a period in which the speed of rotation of a disc is varied for high speed access.

The apparatus for reproducing recorded information according to the present invention is an apparatus for reproducing recorded information which reproduces information and data recorded on an optical disc and comprises: information reading means for reading information recorded on the optical disc to obtain an analog read signal; an A-D converter for sampling the read signal based on a clock signal to convert the sampled signal into a series of digital read samples; waveform equalization means having band characteristics which vary in accordance with the cycle of the clock signal for performing waveform compensation on the series of read samples based on the band characteristics; clock generation means for generating the clock signal based on the series of read samples which has been subjected to the waveform compensation by the waveform equalization means; and decoding means for decoding information and data from the series of read samples which has been subjected to the waveform compensation.

DETAILED DESCRIPTION OF THE EMBODIMENTS

A preferred embodiment of the present invention will now be described with reference to the drawings.

The following description will refer to a DVD, as an example of CLV discs, which is a high density recording medium having a recording capacity much far greater than that of a CD and capable of recording not only digital audio signals but also motion pictures and the like as digital video signals with the size of a compact disc.

Figure 1:
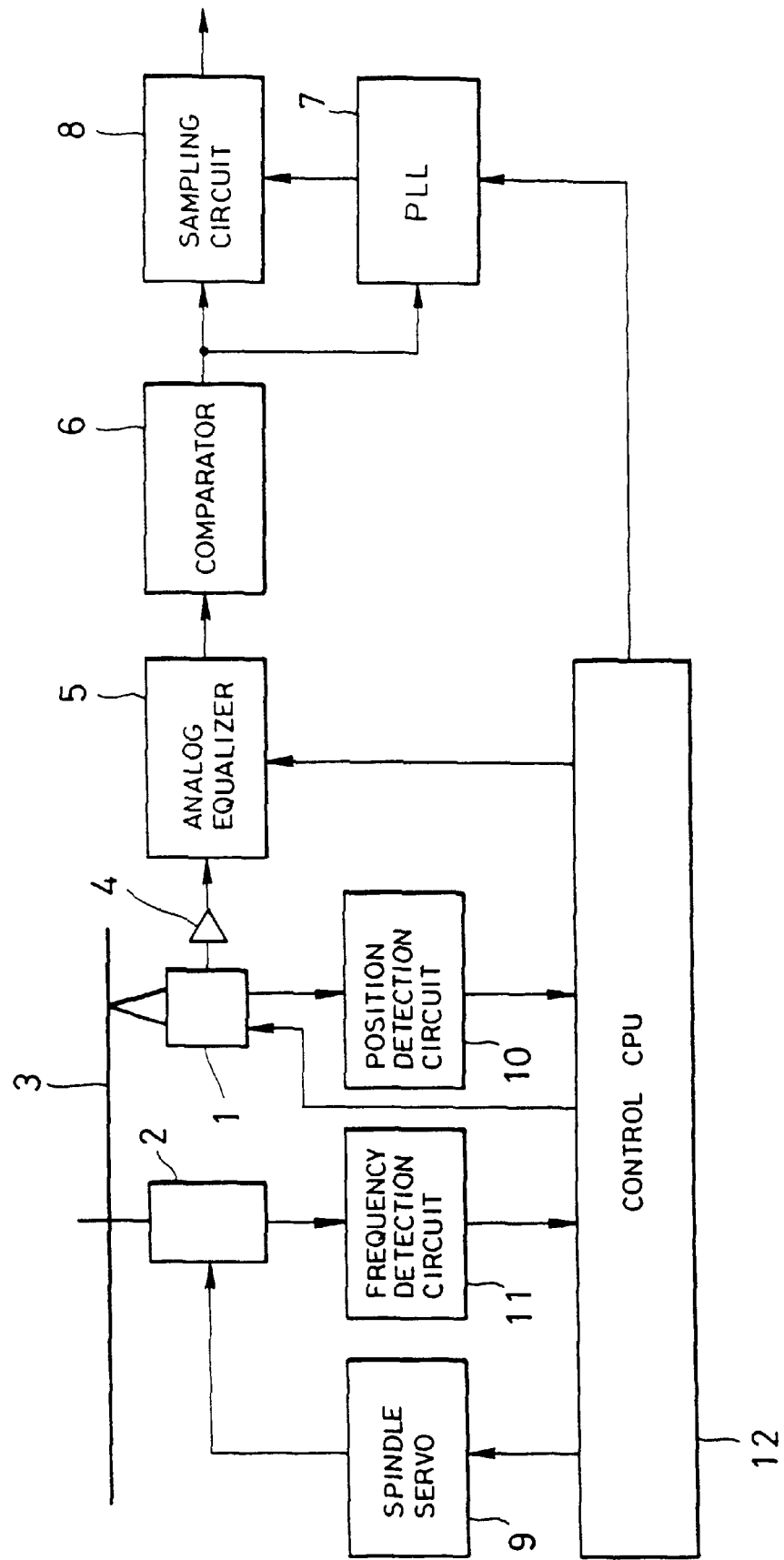
FIG. 1 illustrates a schematic configuration of a CD player.
Figure 2:
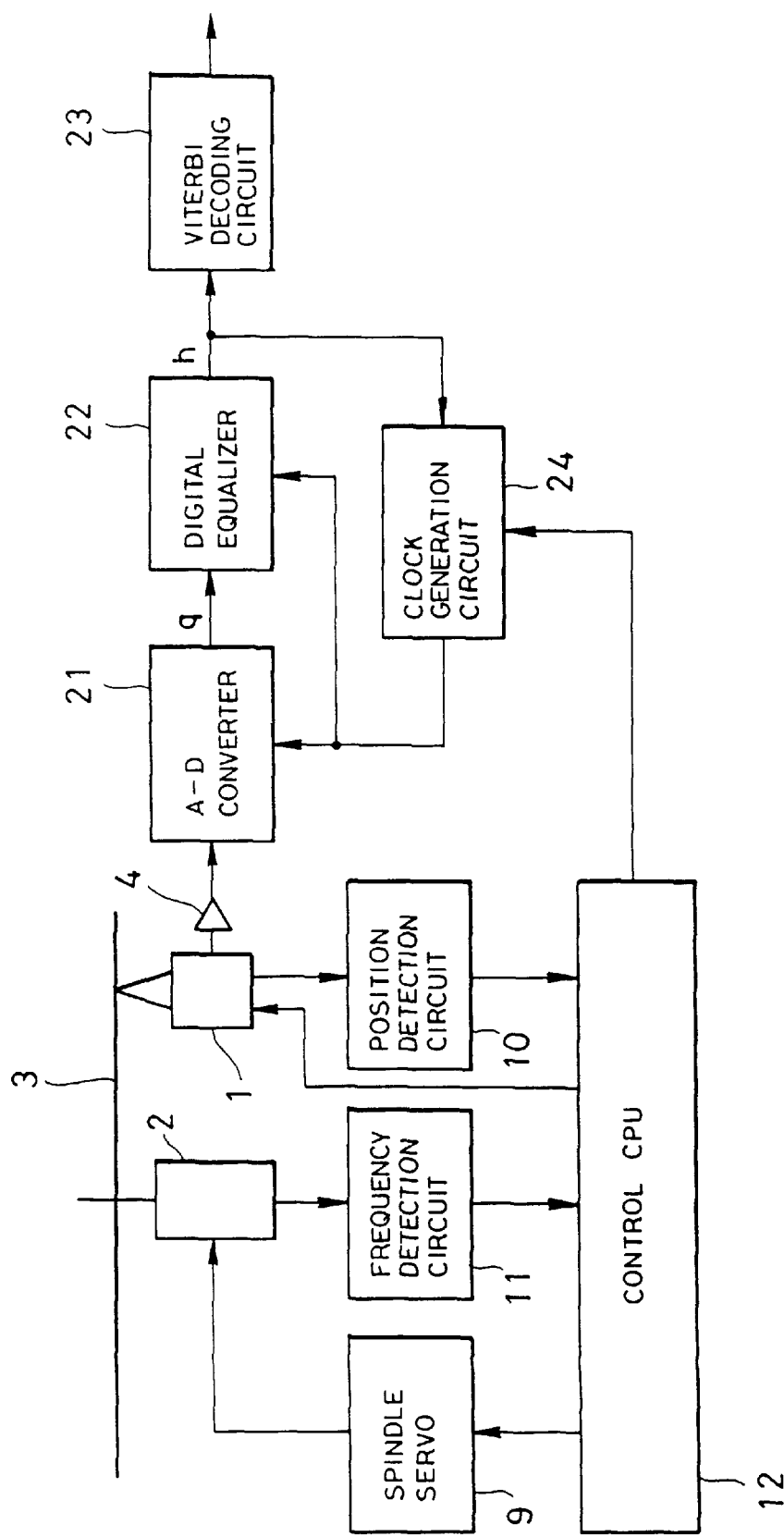
FIG. 2 illustrates a configuration of an apparatus for reproducing recorded information adapted to DVDs according to an embodiment of the present invention.

FIG. 2 illustrates a schematic configuration of an apparatus for reproducing recorded information adapted to a DVD system according to an embodiment of the present invention.

Referring to FIG. 2, a pick-up 1 directs a beam to a DVD disc 3 as a recording medium which is driven for rotation by a spindle motor 2. The pick-up 1 also receives a beam reflected by the DVD disc 3 and generates a read signal having a signal level in accordance with the quantity of the received beam. A head amplifier 4 supplies an amplified read signal to an A-D (analog-to-digital) converter 21 after performing predetermined amplification on such a read signal. The A-D converter 21 samples such an amplified read signal at the timing of a clock signal supplied by a clock generation circuit 24 to be described later, converts (quantizes) it into a sample value in the form of digital data consisting of, for example, eight bits at each timing of sampling, and supplies the sample values to a digital equalizer 22 which is a waveform equalization circuit. That is, sample values in accordance with the signal level of the read signal are sequentially supplied to the digital equalizer 22.

The digital equalizer 22 generates waveform-compensated sample values each of which is adjusted such that, in a frequency band in accordance with the clock signal supplied by the clock generation circuit 24, the higher the frequency of such a sample value in a transition from an increasing tendency to a decreasing tendency or from a decreasing tendency to an increasing tendency (hereinafter referred to as "input sample frequency"), the greater a resultant increase in the amplitude of this series of sample values. The amount of such an increase in the amplitude depends on the equalization coefficient k supplied by the control CPU 12.

That is, the digital equalizer 22 increases the level of high frequency components in the read signal with gain characteristics that depend on the frequency of the clock signal and the equalization coefficient k through such a process on sample values q. Thus, as waveform-compensated sample values h, there is obtained sample values in accordance with a read signal whose amplitude has been increased for high frequency components thereof depending on the speed of rotation of the disc.

Figure 3:
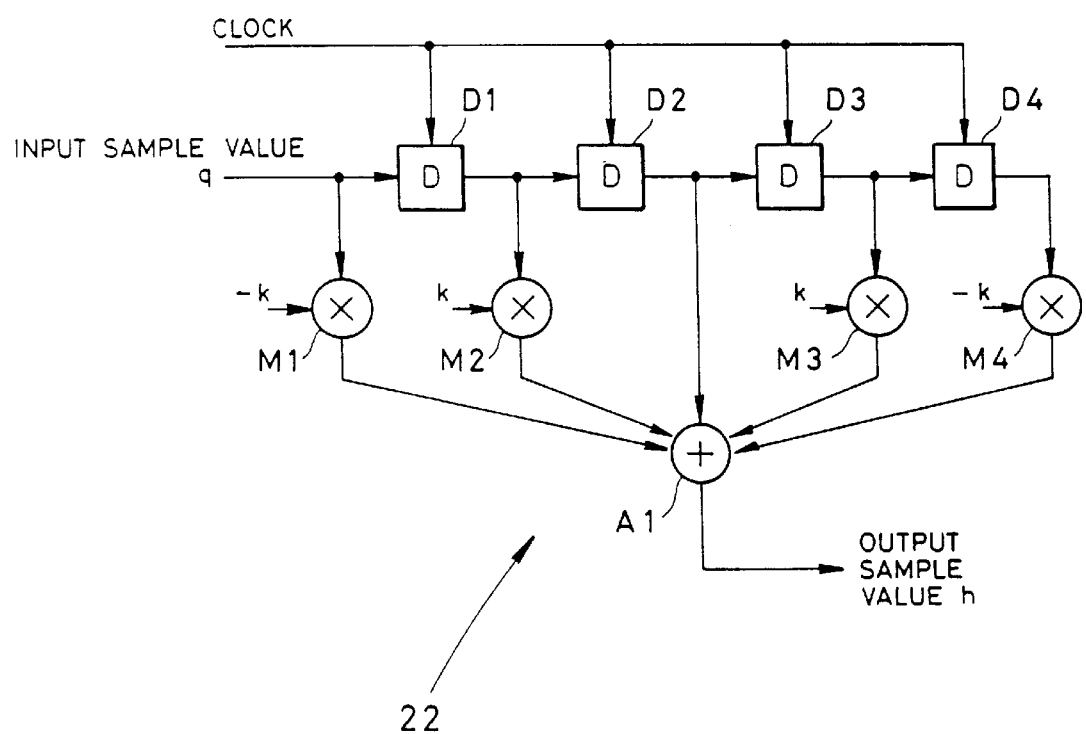
FIG. 3 illustrates an example of the internal configuration of a digital equalizer 22 as a waveform equalization means.

FIG. 3 shows an example of a circuit in which such a digital equalizer 22 is implemented utilizing an FIR (finite impulse response) filter.

Referring to FIG. 3, a multiplier M1 multiplies a sample value q supplied thereto by a negative equalization coefficient −k and supplies the resultant value to an adder A1. A multiplier M2 multiplies a sample value q supplied thereto at a one-clock time delay introduced by a D-flip-flop D1 by a positive equalization coefficient +k and supplies the resultant value to the adder A1. A multiplier M3 multiplies a sample value q supplied thereto at a two-clock time delay introduced by D-flip-flops D2 and D3 by the equalization coefficient +k and supplies the resultant value to the adder A1. A multiplier M4 multiplies a sample value q supplied thereto at another one-clock time delay from the D-flip-flop D3 output introduced by a D-flip-flop D4 by an equalization coefficient −k and supplies the resultant value to the adder A1. The adder A1 adds all of the results of the multiplication at the multipliers M1 through M4 and a sample value q supplied thereto at a two-clock time delay from the input to the filter introduced by the D-flip-flops D1 and D2, and outputs the result of this addition as a waveform-compensated sample value h as described above.

Figure 4:
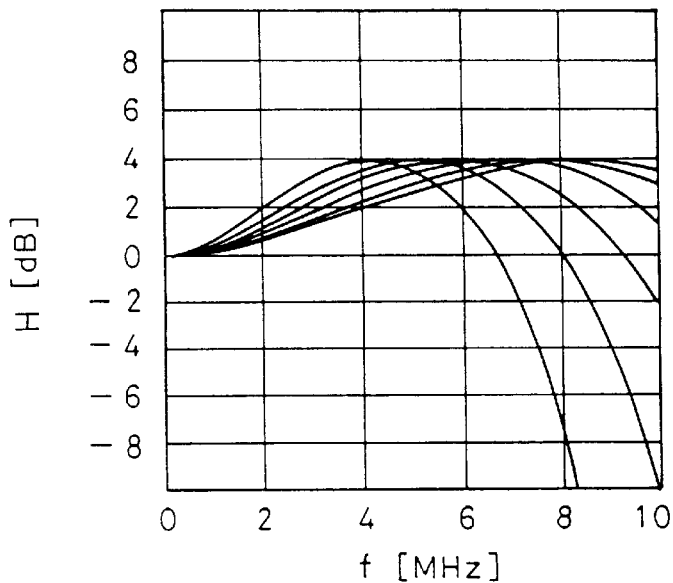
FIG. 4 illustrates variation in band characteristics of the digital equalizer 22 in FIG. 3 relative to the frequency of a clock signal with an equalization coefficient k kept constant.

FIG. 4 illustrates characteristics of the circuit shown in FIG. 3, a transfer function of which is expressed as shown below.

$$H(f)=1+2\ k\cos\ (2\ \pi f/fs)-2\ k\cos\ (4\ \pi f/fs)$$

where H(f) represents the transfer function; f represents an input sample frequency; and fs represents the clock frequency.

That is, the circuit shown in FIG. 3 is a so-called cosine equalizer exhibiting an impulse response (−k, +k, 1, +k, −k) whose band characteristics (a peak frequency and a band characteristic until the peak frequency) vary in accordance with an increase or decrease in the frequency fs of a clock signal supplied by the clock generation circuit 24 as shown in FIG. 4 when the equalization coefficient k supplied by the CPU 12 is fixed and in which the amplitude of a series of waveform-compensated sample values h is greater, the greater the input sample frequency f of sequentially input sample value q is within a band width determined by the frequency fs of such a clock signal.

Since the band characteristics of the digital equalizer 22 shown in FIG. 3 vary depending on the frequency fs of a clock signal as described above, when the clock signal generation circuit 24 to be described later supplies a clock signal which is phase-locked to a read signal from a disc during a transition of the rotational speed of a disc resulting from high speed access, the band characteristics automatically vary to follow the variation of the frequency fs of such a clock signal associated with the variation in the speed of rotation of the disc. Therefore, there is no need for the control CPU 12 to perform any control operation associated with the band characteristics of the waveform equalization circuit except the initialization of the equalization coefficient k.

Although FIG. 3 illustrates an example of the configuration of the digital equalizer in which D-flip-flops are cascade-connected to form four stages with five taps, the present invention is not limited thereto.

Figure 5:
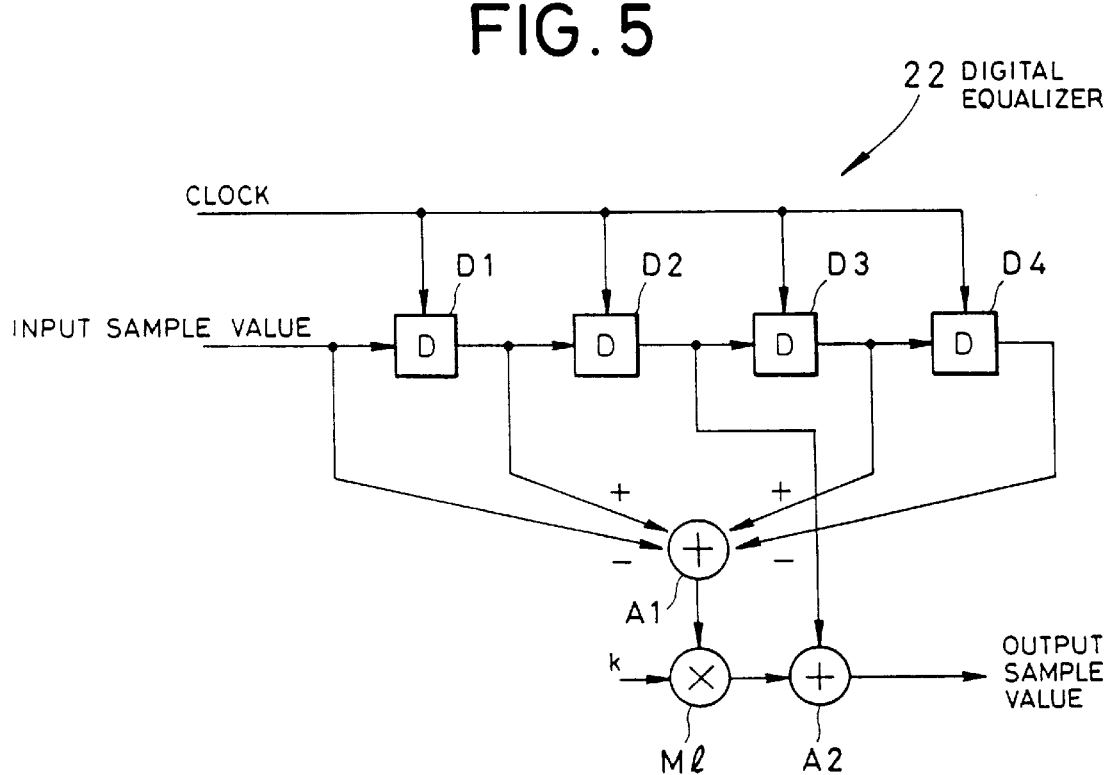
FIG. 5 illustrates an example of a simplified configuration of the digital equalizer 22 shown in FIG. 3.

Further, the digital equalizer shown in FIG. 3 can be simplified as shown in FIG. 5. In this case, the multipliers M1 can be eliminated by setting the equalization coefficient k at $m/2^n$ (m and n are integral numbers).

While a DVD is proposed here, in a reproduction apparatus capable of reproducing any of a plurality of types of recording discs having different recording densities, the equalization coefficient k of the digital equalizer may be changed depending on the type of a disc to set a quantity of enhancement of high frequency components which is suitable for the disc type.

The waveform-compensated sample values h output by the digital equalizer 22 are supplied to a Viterbi decoding circuit 23 and the clock generation circuit 24.

The Viterbi decoding circuit 23 captures the waveform-compensated sample values h as a continuous time series, obtains a series of decoded data which is most likely to present in the light of the series of sample values, and outputs it as reproduction digital signals.

The clock generation circuit 24 causes the frequency of a clock signal to be produced to follow the reference frequency designated by the CPU 12 that provides the linear velocity in accordance with the rotational speed of the disc and synchronizes the phase of such a clock signal with the phase of the series of waveform-compensated sample values h supplied by the digital equalizer 22. In other words, a clock signal is generated with a frequency and a phase synchronized with those of a read signal.

Figure 6:
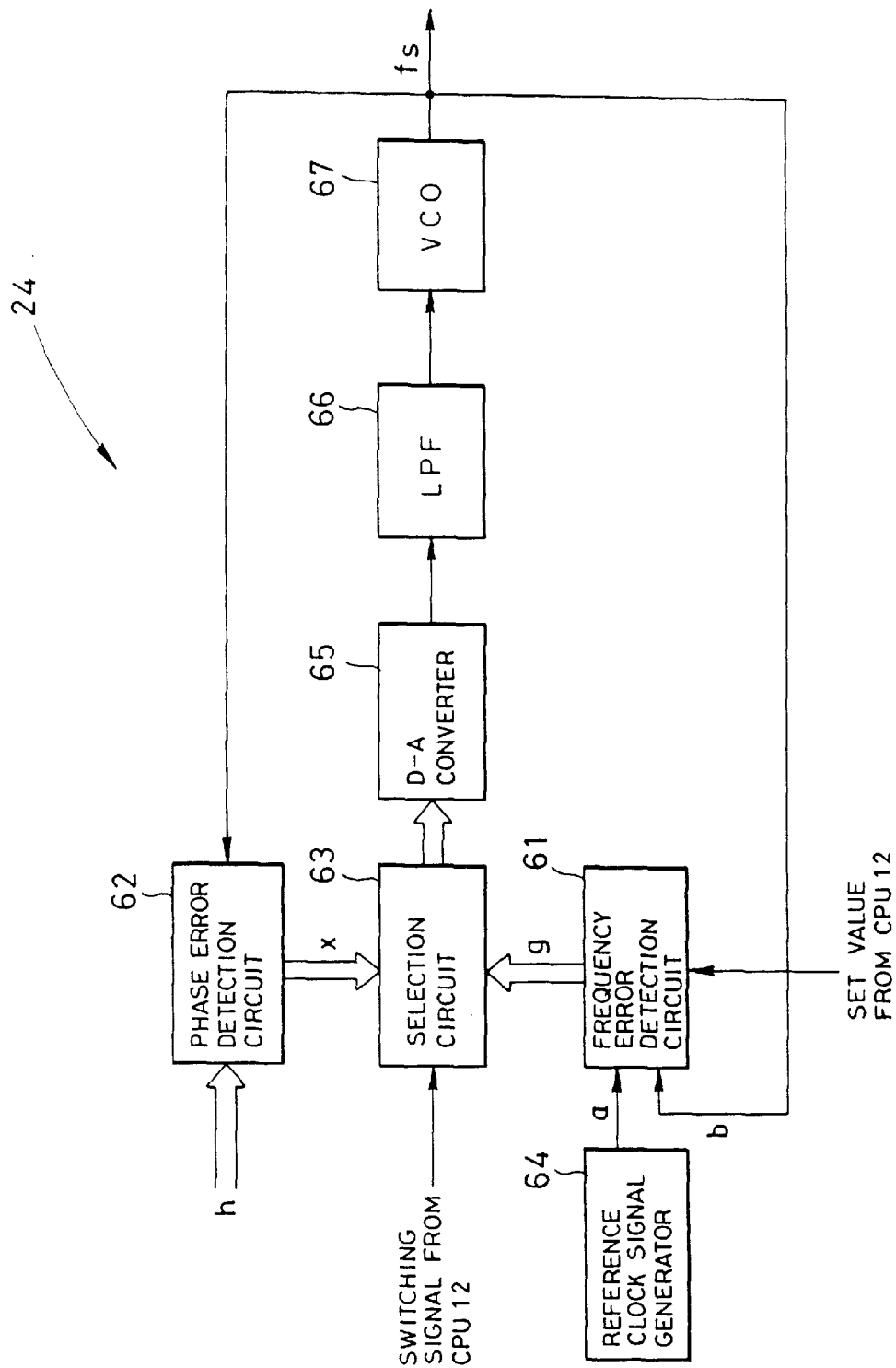
FIG. 6 illustrates an example of the internal configuration of a clock generation circuit 24.

FIG. 6 shows an example of the circuitry of the clock generation circuit 24.

Referring to FIG. 6, a frequency error detection circuit 61 detects any error between the frequency of a signal which is generated based on a set value to be described later supplied by the control CPU 12 and based on the frequency fref of a reference clock signal "a" generated by a reference signal generator 64 and the frequency fs of a clock signal b which is supplied by a VCO 67. A phase error detection circuit 62 extracts the sample value closest to the zero-crossing point from among the series of waveform-compensated sample vales h input thereto to detect any phase error based on the level of the sample value. A selection circuit 63 selectively relays and outputs either the frequency error or phase error detected as described above to a D-A (digital-to-analog) conversion circuit 65 based on a switch signal supplied by the control CPU 12. The relayed and output error signal is supplied through the D-A converter 65 and an LPF (low pass filter) 66 to the VCO 67 which in turn generates a clock signal having a frequency in accordance with such an error signal.

Figure 7:
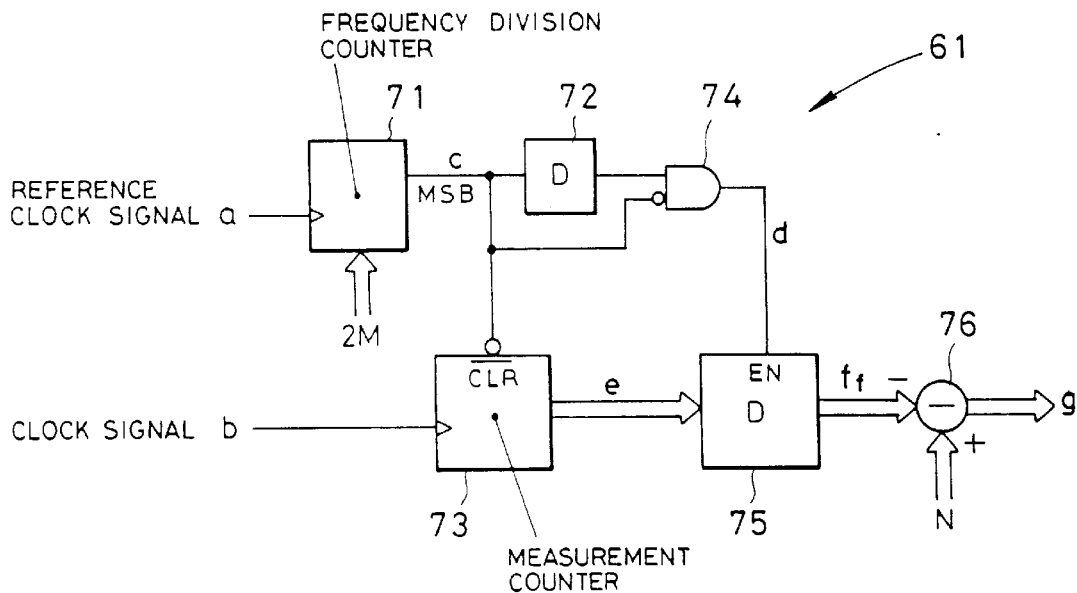
FIG. 7 illustrates an example of the internal configuration of a frequency error detection circuit 61.

FIG. 7 shows a more specific example of the frequency detection circuit 61.

Referring to FIG. 7, a frequency division counter 71 performs frequency division on the reference clock signal "a" supplied by the reference clock signal generator 64 at a frequency division ratio 2M set by the control CPU 12 and supplies a cyclic pulse signal c inverted between H and L levels for each M clock cycle of the reference clock signal "a" to each of a data input terminal of a D-flip-flop 72, a clear input terminal of a measurement counter 73, and an inverted input terminal of an AND gate circuit 74. The D-flip-flop 72 supplies such a cyclic pulse signal c to a positive input terminal of the AND gate circuit 74 with a delay corresponding to one clock cycle of the reference clock signal "a". Therefore, when a transition of the cyclic pulse signal c from the H level to the L level occurs, the AND gate circuit 74 supplies a pulse signal corresponding to one clock cycle of the reference clock signal "a" to a D-register 75 as a hold signal d. Meanwhile, the measurement counter 73 is released from a cleared state for the period in which the cyclic pulse signal c supplied to the clear input terminal stays at the H level to count the clock signal b supplied by the VCO 67 and to supply a resultant count value e to the D-register 75. Therefore, the D-register 75 holds the count value e which is supplied from the measurement counter 73 at the timing when the hold signal d is supplied from the AND gate circuit 74, i.e., the timing when the transition of the cyclic pulse signal c from the H level to the L level occurs. A count value ff held by the D-register 75 increases or decreases with the frequency of the clock signal b supplied by the VCO 67. A subtractor 76 performs subtraction between the count value ff held by the D-register 75 and a reference value N set by the control CPU 12 and supplies the calculated value to the selection circuit 63 as a frequency error signal g.

Figure 8:
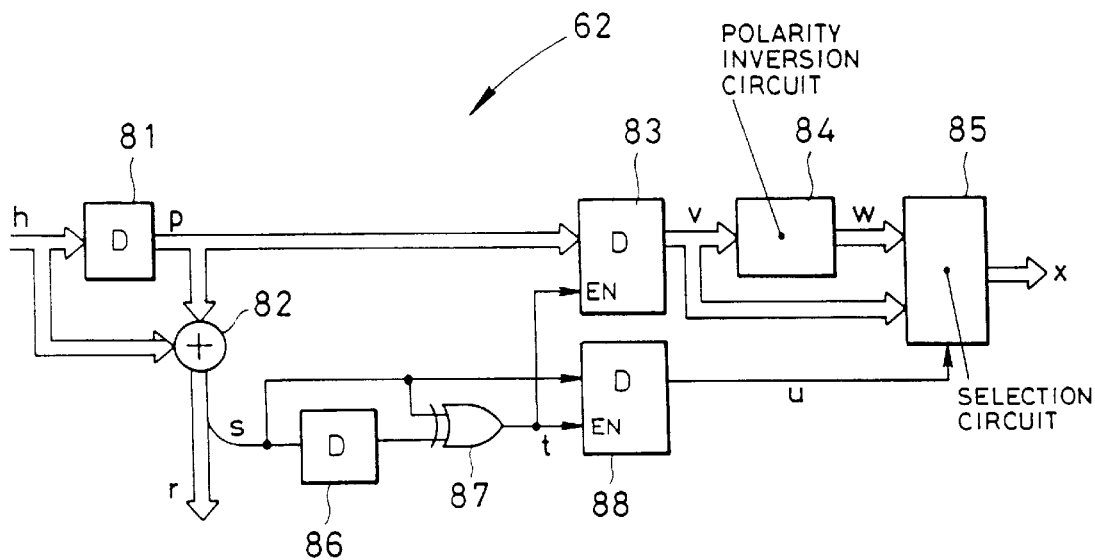
FIG. 8 illustrates an example of the internal configuration of a position error detection circuit 62.

FIG. 8 shows a more specific example of the phase error detection circuit 62.

Referring to FIG. 8, an adder 82 adds a waveform-compensated sample value h supplied by the digital equalizer 22 and a delayed sample value p which has been delayed by a D-flip-flop 81 by an amount corresponding to one sampling cycle. Through such addition, the adder 82 obtains an average sample value r for every two adjacent sample values h on the time series.

An exclusive OR circuit 87 supplies an enable signal t having a logical value "1" to each of D-flip-flops 83 and 88 if the logical value of the MSB (most significant bit, i.e., sign bit) of an average sample value r as described above does not agree with the logical value of the MSB of the average sample value r at a delay corresponding to one sampling clock introduced by a D-flip-flop 86 and, if they are the same logical value, supplies an enable signal t having a logical value "0" to each of the D-flip-flops 83 and 88. In this case, the disagreement between those values indicates that the above-described sample value r is changing from a positive value to a negative value or from a negative value to a positive value, i.e., it is in a so-called zero-crossing state. The exclusive OR circuit 87 operates as a zero-crossing detection means which supplies the enable signal t having a logical value "1" to each of the D-flip-flops 83 and 88 when such a zero-crossing state is detected.

The D-flip-flop 83 accepts a delayed sample value supplied by the D-flip-flop 81 as described above and outputs it to a polarity inversion circuit 84 and a selection circuit 85 as an extracted sample value v only when the enable signal having a logical value "1" is supplied thereto by the exclusive OR circuit 87.

The D-flip-flop 88 accepts the MSB of an average sample value r as described above and outputs it to the selection circuit 85 as a gradient signal u only when the enable signal t having a logical value "1" is supplied thereto by the exclusive OR circuit 87. If the average sample value r is changing from a positive value to a negative value, i.e., if the average sample value r is in a downward transition, the logical value of the gradient signal u is "1" and, if the average sample value r is in an upward transition, the logical value of the gradient signal u is "0". This gradient signal u is used as a switching control signal for the selection circuit 85. A delayed sample value supplied by the D-flip-flop 83 is output as it is as a phase error signal x if the average sample value r is in an upward transition, i.e., if the gradient signal u is "0", and a delayed sample value with the polarity thereof inverted, supplied by the polarity inversion circuit 84, is output as the phase error signal x if the average sample value r is in a downward transition, i.e., if the gradient signal u is "1".

That is, the phase error detection circuit 62 having the configuration as shown in FIG. 8 detects a zero-crossing interval during which an average sample value r of the waveform-compensated sample values h supplied by the digital equalizer 22 is in a transition from a positive value to a negative value or from a negative value to a positive value, outputs a sample value that exist in such an interval as an extracted sample values v, and selects either the extracted sample value or sample value which is the result of polarity inversion on the extracted sample value according to the gradient signal u to provide the phase error signal x. Since the average sample value r is derived from the waveform-compensated sample values h supplied by the digital equalizer 22, such a phase error signal x serves as an accurate phase difference signal which allows the VCO 67 to output a clock signal having an accurate phase.

A description will now be made on a control operation that the control CPU 12 performs on the clock signal generation circuit having the above-described configuration.

In a transition of the rotational speed of the spindle motor carrying a DVD during activation of or access to the apparatus for reproducing recorded information of the present invention, the control CPU 12 sets the frequency division ratio M and the reference value N as described above to cause the frequency of the clock signal to follow the frequency of a signal read from the DVD that varies depending on the variation of the rotational speed and performs switching control to switch the relayed signal relayed by the selection circuit 63 from a frequency error signal to a phase error signal.

The frequency division ratio M and the reference value N set by the control CPU 12 will now be described.

When the oscillation frequency fs of the VCO 67 is controlled based on the frequency error signal g supplied by the frequency error detection circuit 61 shown in FIG. 6, a frequency control loop including the frequency error detection circuit 61, D-A converter 65, LPF 66, and VCO 67 is configured. In such a frequency control loop, feedback control is performed such that the count value ff held in the D-register 75 shown in FIG. 7 equals the set value N. Specifically, the following conditional expression is satisfied for the frequency error detection circuit in FIG. 7 because of the configuration thereof.

$$N/fs = M/fref$$

Therefore, $fs = fref \cdot N/M$.

Thus, the values M and N are set such that the frequency of a read signal obtained by reproducing a CLV disc at a predetermined linear velocity agrees with the frequency of the clock signal output by the VCO 67.

In general, since the moving speed of a pick-up is sufficiently higher than the speed of response of rotation control over a spindle motor associated with a search operation, the speeds of rotation of a spindle motor immediately before and after a search and are substantially equal to each other. Therefore, when a CLV disc is accessed at a high speed, the frequency of a read signal before a search and the frequency of a read signal after the search are different from each other. More specifically, the frequency of a read signal obtained immediately after a search is higher, the closer to the outer circumference the radial reading position is as a result of the search. The closer to the inner circumference, the higher the frequency of a read signal.

The control CPU 12 sets the frequency division ratio M and/or reference value N depending on the radial position of the pick-up on the disc after a search taking the above-describe point into consideration. More specifically, the frequency division ratio M is set inversely proportionate to the radial distance of the disc until the reading position on the disc, and the reference value N is set proportionate to that radial distance.

With the frequency division ratio M and reference value N set as described above, the frequency of a read signal obtained immediately after a search substantially equals the frequency of the clock signal output by the clock signal generation circuit 24. The control CPU 12 monitors the frequency error signal g output by the frequency error signal detection circuit 61 and generates a switch signal upon detecting that the frequency error signal g is equal to or less than a predetermined level to cause the selection circuit 63 to select the phase error signal x from the phase error signal detection circuit 62. Thus, the clock signal generation circuit 24 generates a clock signal in synchronism with the phase of a series of sample values generated from a read signal. One phase synchronization is achieved, the speed of rotation of the spindle motor is varied to achieve the speed of rotation at a location to be searched and, even if the frequency of the read signal varies accordingly, the clock signal is in phase-synchronism with the read signal provided that such variation in the frequency is within the band that the clock generation circuit 24 can follow. That is, the control CPU 12 is only required to set the frequency division ratio M and reference value N in accordance with a radial position on a disc to be searched, i.e., the frequency the clock signal should have, and to perform control such that switching to the phase error signal occurs after confirming that the frequency of the clock signal has been locked to the set frequency. Therefore, no need exists for performing the control operation to follow variation in the frequency of a read signal originating in variation of the rotational speed of the spindle motor.

As described above, the clock signal output by the clock signal generation circuit 24 is in synchronism with the frequency and phase of a read signal and such a clock signal is output to the digital equalizer 22. Therefore, even in a transition of the rotational speed of a disc caused by, for example, high speed access, the band characteristics of the digital equalizer 22 automatically vary to follow variation in the frequency fs of such a clock signal associated with the variation in the rotational speed of the disc. Thus, the control CPU 12 is required only to initialize the equalization coefficient k and is freed from a complicated process associated with the setting of the band characteristics of the waveform equalization circuit.

Although the above description has referred to an example in which a controlled voltage signal supplied from the selection circuit 63 to the VCO 67 through the D-A converter 65 and LPF 66 is switched from a frequency error signal to a phase error signal, an addition circuit may be employed instead of the selection circuit 63.

Figure 9:
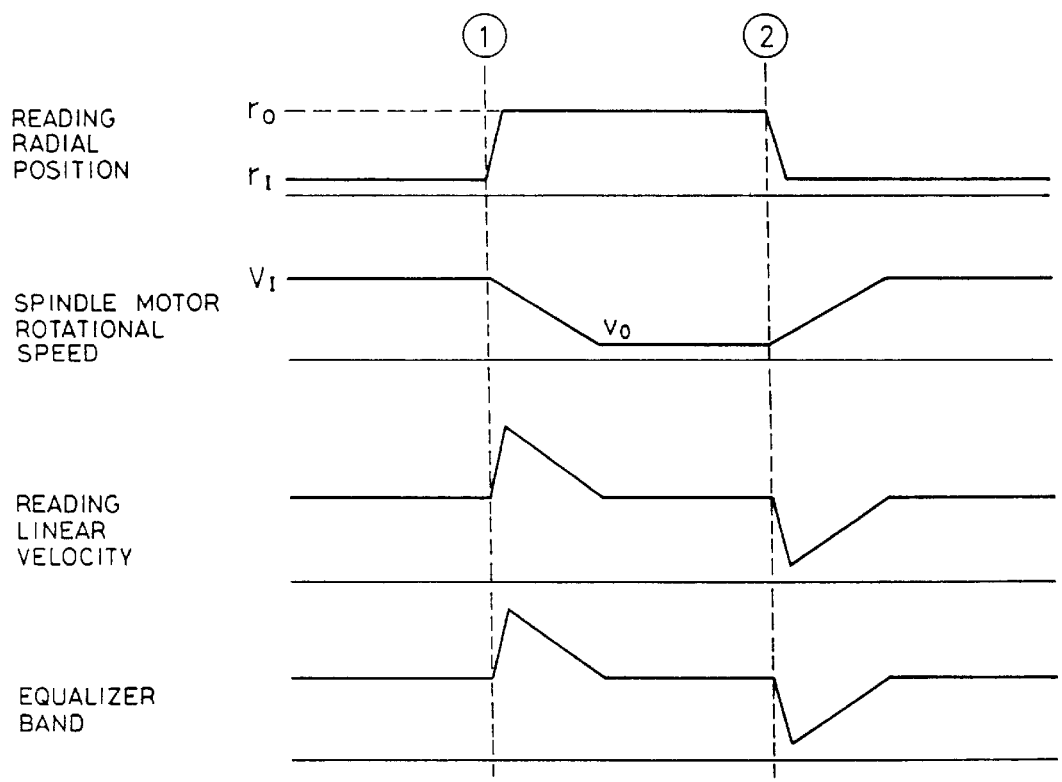
FIG. 9 is a conceptual illustration of operational states relative to each of the speed of rotation of a spindle motor, the frequency of a read signal, and the peak frequency of the digital equalizer 22 during high speed access according to the embodiment of the invention.

FIG. 9 is a conceptual illustration of operational states relative to each of the speed of rotation of a spindle motor, the frequency (reading linear velocity) of a read signal, and the peak frequency of the digital equalizer 22 during high speed access according to the embodiment of the invention.

FIG. 9 shows a case wherein a search the reading position of the pick-up 1 on a DVD 3 in the radial direction thereof is moved to perform a search from an inner circumferential position $r_I$ to an outer circumferential position $r_O$ (point ①) and a case wherein the reading position is moved from the outer circumferential position $r_O$ to the inner circumferential position $r_I$ (point ②). In order to maintain a predetermined linear velocity even in the transition of the reading position for the search, the speed of rotation of the spindle motor is gradually varied from a speed $v_I$ at the point ① as the starting point to a speed $v_O$. The moving speed of the pick-up 1 is sufficiently faster than the response speed of the rotation control over the spindle motor associated with a search operation as previously described. Therefore, when the pick-up 1 has been moved to the outer circumferential position $r_O$, the speed of rotation of the spindle motor is substantially equal to $v_I$, and the frequency of a read signal read by the pick-up is high.

Meanwhile, the clock generation circuit 24 generates a clock signal having a frequency corresponding to the frequency of the signal read at the outer circumferential position $r_O$ when the speed of rotation of the spindle motor is $v_I$ under the control of the control CPU 12. The frequency of this clock signal varies in accordance with the frequency of the read signal, i.e., in accordance with the speed of rotation of the spindle motor which varies toward the speed of rotation $v_O$ that provides a predetermined linear velocity associated with the outer circumferential position $r_O$. Thus, the band characteristics (peak frequency) of the digital equalizer 22 to which such a clock signal is supplied also automatically vary in accordance with the variation in the read signal.

Similarly, during the movement from the outer circumferential position $r_O$ to the inner circumferential position $r_I$ (point ②), the speed of rotation of the spindle motor gradually varies from $v_O$ at the point ② as the starting point to $v_I$. When the pick-up 1 has been moved to the inner circumferential position $r_I$, the speed of rotation of the spindle motor is substantially equal to $v_O$, and the frequency of a read signal read by the pick-up is low.

Meanwhile, the clock generation circuit 24 generates a clock signal having a frequency corresponding to the frequency of the signal read at the outer circumferential position $r_I$ when the speed of rotation of the spindle motor is $V_O$ under the control of the control CPU 12. The frequency of this clock signal varies in accordance with the frequency of the read signal, i.e., in accordance with the speed of rotation of the spindle motor which varies toward the speed of rotation $v_I$ that provides a predetermined linear velocity associated with the inner circumferential position $r_I$. Thus, the band characteristics (peak frequency) of the digital equalizer 22 to which such a clock signal is supplied also automatically vary in accordance with the variation in the read signal.

Although the above description is based on an assumption that a DVD which is a CLV disc is reproduced on a CLV basis, the present invention is applicable to a case wherein a DVD is reproduced on a CAV basis. In such a case, the closer to the outer circumference the radial reading position, the higher the frequency of the read signal. However, since the frequency of the clock signal also varies in accordance with the read signal, the equalizer can always maintain the optimum band characteristics.

Figure 10:
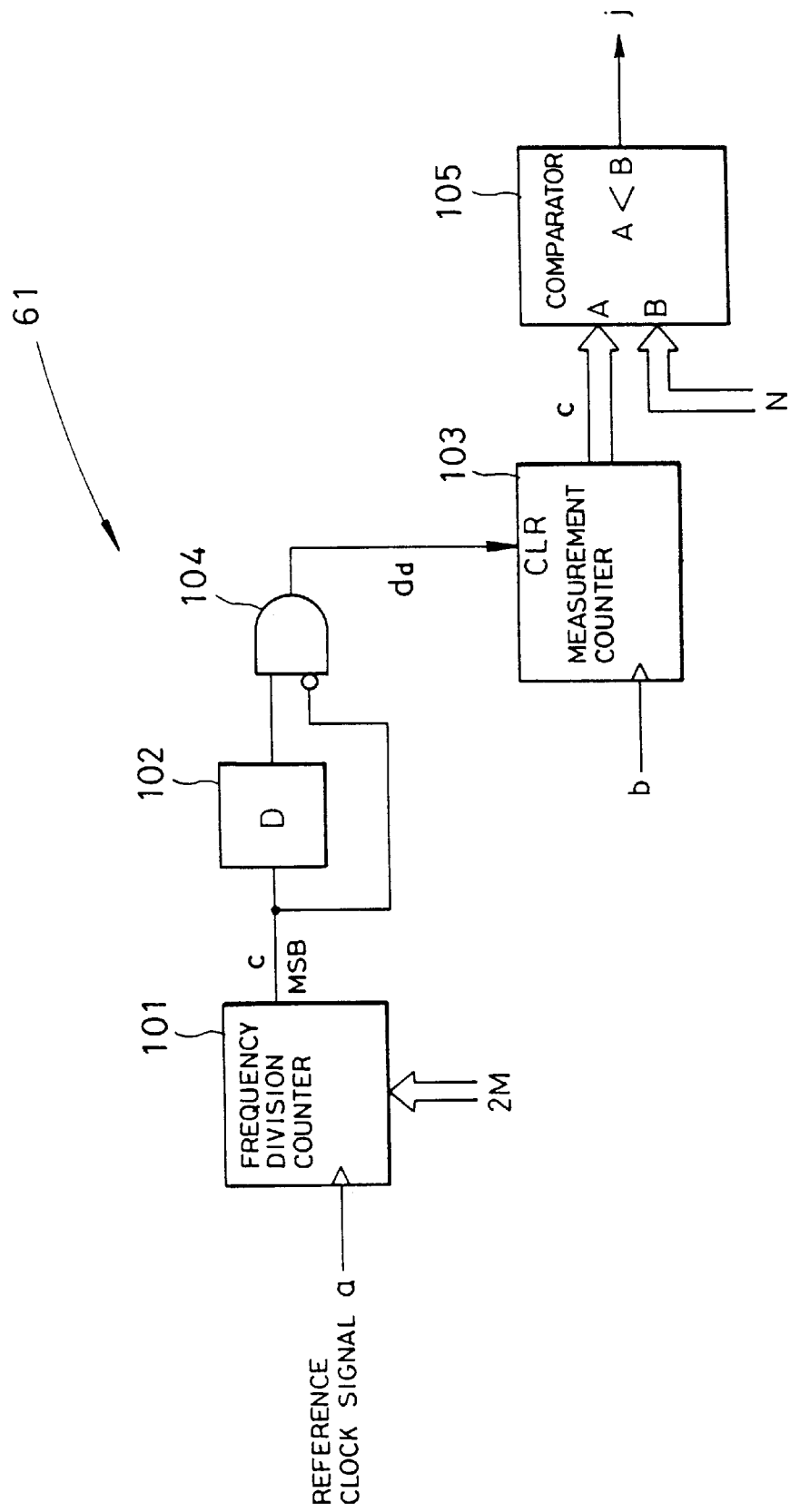
FIG. 10 illustrates another example of the internal configuration of the frequency error detection circuit 61.

The frequency error detection circuit 61 may be implemented with the configuration shown in FIG. 10.

The frequency division counter 101 in FIG. 10 performs frequency division on a reference clock signal "a" supplied by the reference clock signal generator 64 at a frequency division ratio 2M set by the control CPU 12 to supply a cyclic pulse signal c inverted between H and L levels at each M clock cycle of the reference clock signal "a" to each of a data input terminal of a D-flip-flop 102 and an inverted input terminal of an AND gate circuit 104. The D-flip-flop 102 supplies such a cyclic pulse signal c to a positive input terminal of the AND gate 104 at a delay corresponding to one clock cycle of the reference clock signal "a". Thus, the AND gate 104 supplies a pulse signal dd corresponding to one clock cycle of the reference clock signal "a" to a measurement counter 103 when a transition of the cyclic pulse signal c from the H level to the L level occurs. The measurement counter 103 counts clock signals b supplied by the VCO 67 and supplies a resultant count value i to a comparator 105. This count value i is cleared when the pulse signal dd is supplied to a clear input terminal. The comparator 105 compares a reference value N set by the control CPU 12 and the count value i, and if the count value i is smaller than the reference value N, the comparator outputs an output pulse j at the H level having a duration that depends on the difference between those values. If the frequency of the clock signals b is higher than the frequency corresponding to the reference value N, the output pulse signal j has a short duration of H level and, if the frequency of the clock signal is lower, the duration of H level is longer.

This output pulse j is supplied to the VCO 67 through an appropriate interface circuit as a frequency error signal to control the oscillation frequency of the VCO 67, whereby feedback control is performed such that the output pulse j has a duty of 50%. Therefore, the following conditional expression is satisfied for such a configuration of the frequency error detection circuit as for the frequency error detection circuit shown in FIG. 7.

$$fs = fref \cdot N/M$$

Figure 11:
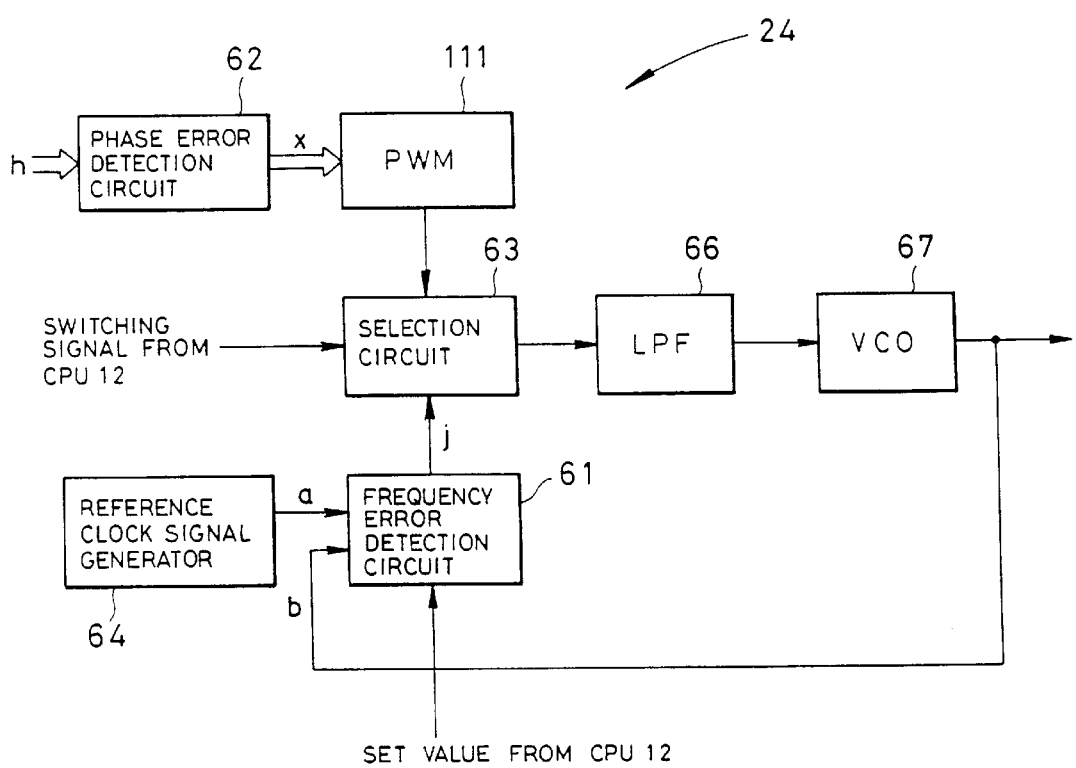
FIG. 11 illustrates another example of the internal configuration of the clock generation circuit 24.

When the frequency error detection circuit shown in FIG. 10 is employed, in order to achieve matching with a phase error detection signal at the clock signal generation circuit 24, a configuration is necessary which supplies a phase error signal in the form of a digital signal output by the phase error detection circuit 62 to the selection circuit 63 after converting it into an analog pulse signal through a PWM (pulse width modulation) modulator 111, as illustrated in FIG. 11.

Although the present embodiment has been described on an assumption that the reproducing apparatus performs reproduction on a CLV or CAV basis on the entire reproduction area of the DVD, the present invention is applicable to reproduction in which CLV reproduction and CAV reproduction are partially mixed.

Further, the present invention can be applied to the so-called MCLV (Modified CLV) in which a reproduction area of a disc is divided into a plurality of concentric circular zones and the speed of the spindle motor is switched for each zone and the so-called MCAV (Modified CAV) in which the frequency of the clock signal is switched for each zone.

As described above, an apparatus for reproducing recorded information according to the present invention has a configuration which employs a waveform equalization means having band characteristics varying depending on the frequency of a clock signal for performing waveform compensation on a series of read samples and in which the band characteristics of the waveform equalization means are controlled by a clock signal generated based on a series of sample values which have been subjected to waveform compensation by the waveform equalization means.

Therefore, in such a configuration, the band characteristics are set in accordance with the cycle of a clock signal having an accurate phase relative to a read signal, generated based on a series of sample values which have been subjected to waveform compensation. This is preferable in that the control CPU is freed from complicated processing operations associated with the setting of the band characteristics of the waveform equalization circuit in a transition of the speed of rotation of a disc resulting from high speed access.

Although a preferred embodiment of the invention has been illustrated and described, it is readily understood by those skilled in the art that various modifications may be made therein without departing from the spirit of the invention or from the scope of the appended claims.

What is claimed is:

1. An apparatus for reproducing recorded information which reproduces information and data recorded on an optical disc, comprising:
    information reading means for reading information recorded on said optical disc to obtain an analog read signal;
    an A-D converter for sampling said read signal based on a clock signal to convert the sampled signal into a series of digital read samples;
    waveform equalization means having band characteristics for performing waveform compensation on said series of read samples based on said band characteristics, said band characteristics being varied in accordance with the frequency of said clock signal;
    clock generation means for generating said clock signal whose frequency varies in accordance with a reproduction speed of said optical disc when a reproduction radius of said optical disc has been changed; and
    decoding means for decoding information and data from said series of read samples which has been subjected to the waveform compensation.

2. An apparatus for reproducing recorded information according to claim 1, wherein said waveform equalization means comprises:
    delay means having a plurality of delay blocks cascade-connected to each other to which said series of read samples is input; and
    addition means for adding each series of output samples from said delay means and a series of input samples to the delay block at the first stage of said delay blocks,
    and wherein the amount of delay at each of said delay blocks is varied in accordance with said clock signal.

3. An apparatus for reproducing recorded information according to claim 1, wherein said waveform equalization means comprises:
    delay means having four delay blocks cascade-connected to each other to which said series of read samples is input; and
    addition means for adding each series of output samples from said delay means and said series of read samples,
    and wherein the amount of delay at each of said delay blocks is varied in accordance with said clock signal.

4. An apparatus for reproducing recorded information according to claim 1, wherein said waveform equalization means comprises:
    delay means having a plurality of delay blocks cascade-connected to each other to which said series of read samples is input;
    coefficient multiplication means for multiplying each series of output samples from said delay blocks and a series of input samples of the delay block at the first stage of said delay blocks by the corresponding control coefficient; and
    addition means for adding the output values of the multiplication at said coefficient multiplication means,
    and wherein the amount of delay at each of said delay blocks is varied in accordance with said clock signal and said control coefficients are variable.

* * * * *